(12) United States Patent
Polka

(10) Patent No.: US 7,537,227 B1
(45) Date of Patent: May 26, 2009

(54) REMOVABLE SIDE STEP FOR A VEHICLE

(76) Inventor: John G. Polka, 1335 Margate, Libertyville, IL (US) 60048

( * ) Notice: Subject to any disclaimer, the term of this patent is extended or adjusted under 35 U.S.C. 154(b) by 349 days.

(21) Appl. No.: 11/371,962

(22) Filed: Mar. 9, 2006

(51) Int. Cl.
*B60R 3/00* (2006.01)

(52) U.S. Cl. ..................... 280/163; 280/169

(58) Field of Classification Search .......... 280/163, 280/169, 164.1
See application file for complete search history.

(56) References Cited

U.S. PATENT DOCUMENTS

| | | | | |
|---|---|---|---|---|
| 1,545,573 A * | 7/1925 | Raiche | | 280/163 |
| 1,678,657 A * | 7/1928 | Thomas | | 280/164.1 |
| 3,684,311 A * | 8/1972 | Pierce | | 280/847 |
| 4,311,320 A * | 1/1982 | Waters, Jr. | | 280/163 |
| 4,935,638 A * | 6/1990 | Straka | | 280/164.1 |
| 4,943,085 A * | 7/1990 | Straka | | 280/770 |
| 5,193,829 A * | 3/1993 | Holloway et al. | | 280/163 |
| 5,257,847 A * | 11/1993 | Yonehara | | 296/151 |
| 5,286,049 A * | 2/1994 | Khan | | 280/163 |
| 5,382,035 A * | 1/1995 | Waddington et al. | | 280/169 |
| 5,769,439 A * | 6/1998 | Thompson | | 280/163 |
| 5,823,553 A * | 10/1998 | Thompson | | 280/164.1 |
| 6,082,752 A * | 7/2000 | Sumrall | | 280/163 |
| 6,502,863 B1 * | 1/2003 | Takahashi et al. | | 280/847 |
| 6,592,135 B2 * | 7/2003 | Hendrix | | 280/164.1 |

* cited by examiner

*Primary Examiner*—Christopher P Ellis
*Assistant Examiner*—Bridget Avery
(74) *Attorney, Agent, or Firm*—Robert L. Marsh

(57) ABSTRACT

A side step for a vehicle has a forward projection that extends into the front fender well of a vehicle and a rearward projection that extends into the rear fender well of the vehicle. Quick release bolt type connectors retain the forward projection in the front fender well and retain the rear projection in the rear fender well such that the side step can be removed from the vehicle for off road driving by unthreading the retaining bolts.

4 Claims, 4 Drawing Sheets

REMOVABLE SIDE STEP FOR A VEHICLE

The present invention relates to side steps for vehicles intended for both on road and off road use where the connectors for removably retaining the side step are not positioned below the vehicle so as not to become damaged during off road use.

BACKGROUND OF THE INVENTION

Certain vehicles are manufactured for use both on hardened roadways and off road and across rough terrain. The wheel assemblies for such vehicles are structured to support the vehicle body higher above the underlying road or ground than are vehicles intended for road use alone. As a result, many vehicles intended for both on road and off road use often have a side step positioned below the doorway upon which a passenger can step when entering and exiting the vehicle. The side steps are functional, but are also decorative and enhance the overall appearance of the vehicle to which they are attached. Some of the side steps, for example, those made for vehicles under the trademark Hummer, are cylindrical in shape and may be either painted or chrome. The side steps are also positioned against or below the rocker panels of the vehicle where they are easily damaged by obstacles along the path of the vehicle.

When such vehicles having side steps are taken off road, it is desirable to remove the decorative side steps so they will not be damaged by large stones and other hard objects encountered on the rough terrain across which the vehicle is being driven. Where the side steps are cylindrical, the ends of the side steps include bends that direct the ends thereof underneath the body of the vehicle where they are received in mounting brackets that retain the side steps to the vehicle body. Such mounting brackets, however, extend downwardly from the lower surface of the vehicle and the mounting brackets themselves become damaged during off road use. Even where the mounting brackets are not damaged, they often become encrusted with mud and the like which may be hard to remove and interferes with the insertion of the cylindrical ends of the side steps into the retaining brackets. It would be desirable therefore, to provide an improved mounting for removably retaining a side step to a vehicle where the side step would not be mounted in a retainer positioned below the bottom of the vehicle.

SUMMARY OF THE INVENTION

Briefly, the present invention is embodied in a removable side step for a vehicle where the vehicle has a body that includes a front fender well and a rear fender well. The side step is an elongate member, which may be tubular with a cylindrical cross section, the elongate member having a forward end, a rearward end, and a longitudinal axis. At the forward end of the elongate member is a forward projection extending perpendicular to the longitudinal axis for attachment to a forward portion of the vehicle and at the rearward end of the member is a rearward projection that also extends generally perpendicular to the longitudinal axis for attachment to a rearward portion of the vehicle.

A first attachment member is on the forward projection and a second attached member is on the rearward projection, with the first attachment member received by a quick release connector in the front fender well of the vehicle and the second attachment member received by a quick release connector in the rear fender well of the vehicle.

In the preferred embodiment, the first attachment member at the forward end of the elongate member includes a bracket and a plate where the bracket retains the step member to the plate and the plate is shaped and sized to fit along a surface of the vehicle body within the front fender well. Similarly, a second bracket with a mounting plate attached thereto is connected to the second attachment member with the second mounting plate sized and shaped to extend along a surface of the vehicle within the rear fender well.

Attached to each of the mounting plates is a connector member that is complementary to a quick release connector mounted inside each of the front and rear wheel fender wells. In the preferred embodiment, the quick release connector is in the form of a tubular member sized to receive a cylindrical pin mounted on the mounting plate attached for removably attaching the side step to the vehicle. A grease fitting is provided on the connectors to lubricate the parts that are assembled or disassembled to attach or detach the side step.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENT

Figure 1:
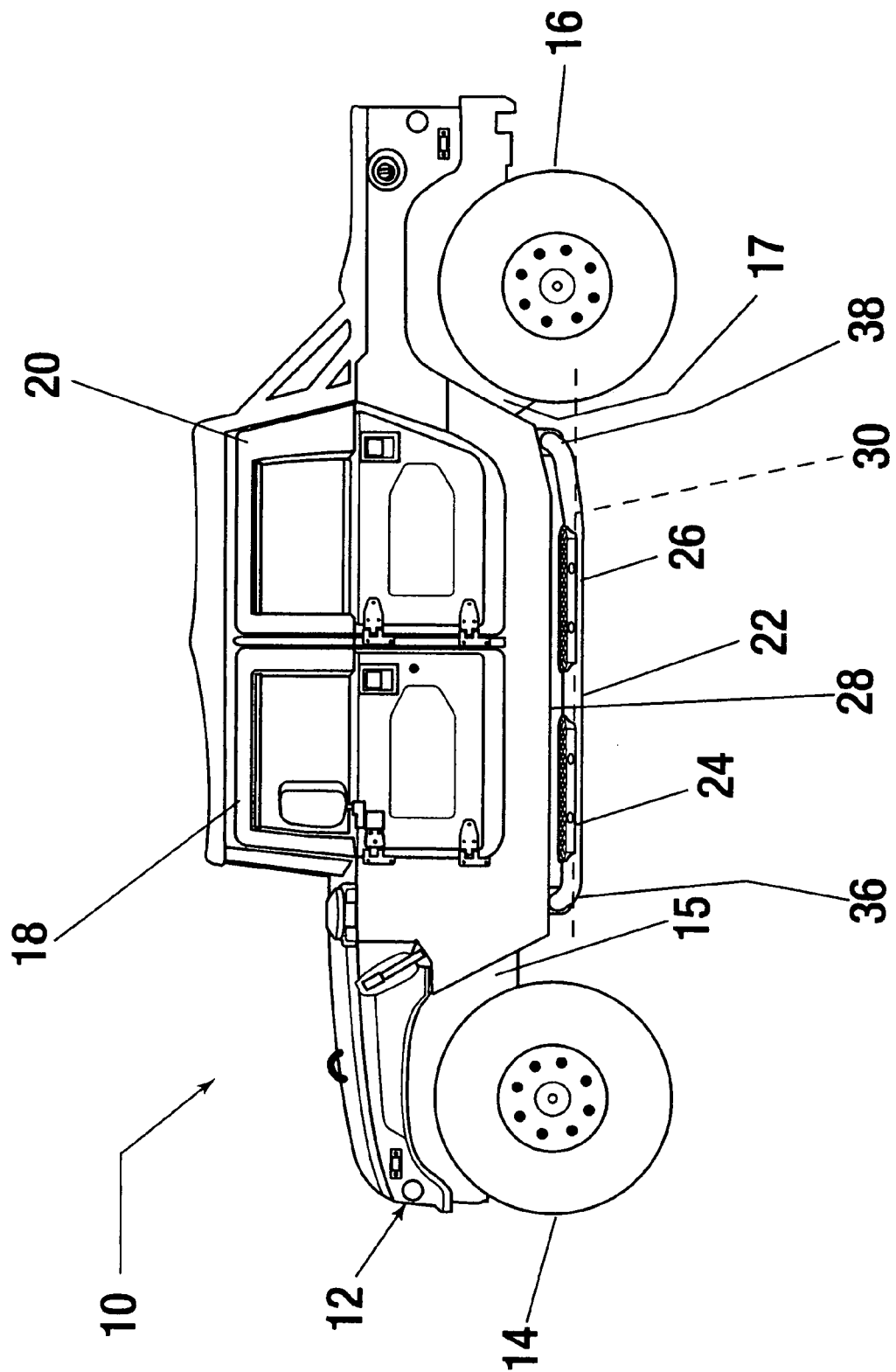
FIG. 1 is a side elevational view of a vehicle having a removable side step in accordance with the present invention.

Referring to FIG. 1, a vehicle 10 adapted for both on road and off road use includes a body 12 and mounted on the body are four wheels, two of which are visible, a front wheel 14 mounted in a front fender well 15 and a rear wheel 16 mounted in a rear fender well 17. The vehicle also has four doors, two of which 18, 20 are visible. Extending under the doors 18, 20 is a decorative side step 22. The side step 22 may be in the form of a cylinder having an overall diameter of approximately three inches with flattened or treaded portions 24, 26 under each of the doors 18, 20. The flattened portions 24, 26 may have a rubberized tread on the upper surface thereof to serve as a step for entering and exiting the doors of the vehicle.

Vehicles having a side step 22 in accordance with the prior art are connected by attachments that extend from the bottom surface 28 of the vehicle body. When the vehicle 10 is to be driven off road, it is desirable to remove the side steps 22 so they do not become damaged by the irregular terrain across which the vehicle is driven. Side steps mounted to vehicles in according to the prior art have connectors extending from the bottom surface 28 of the often become damaged by the rough terrain across which the vehicle is driven, making it difficult or impossible to reassemble the side step to the vehicle.

Referring to FIGS. 1 through 4, a side step 22 in accordance with the present invention has a longitudinal axis 30 and at the forward end thereof is a first projection 32 that extends generally perpendicular to the longitudinal axis 30 and towards a longitudinal centerline, not shown, along the bottom surface of the vehicle body 12. The side step 22 also has a second projection 34 extending from the rear end thereof and extending generally perpendicular to the longitudinal axis and toward the centerline of the vehicle body 12. Where the side step 22 is configured as a tubular member, the side step 22 and the first and second projections 32, 34 may be formed of a single part having a first bend 36 joining the first projection 32 to the central portion of the side step 22, and a second bend 38 joining the second projection 34 to the central portion of the side step 22.

Figure 2:
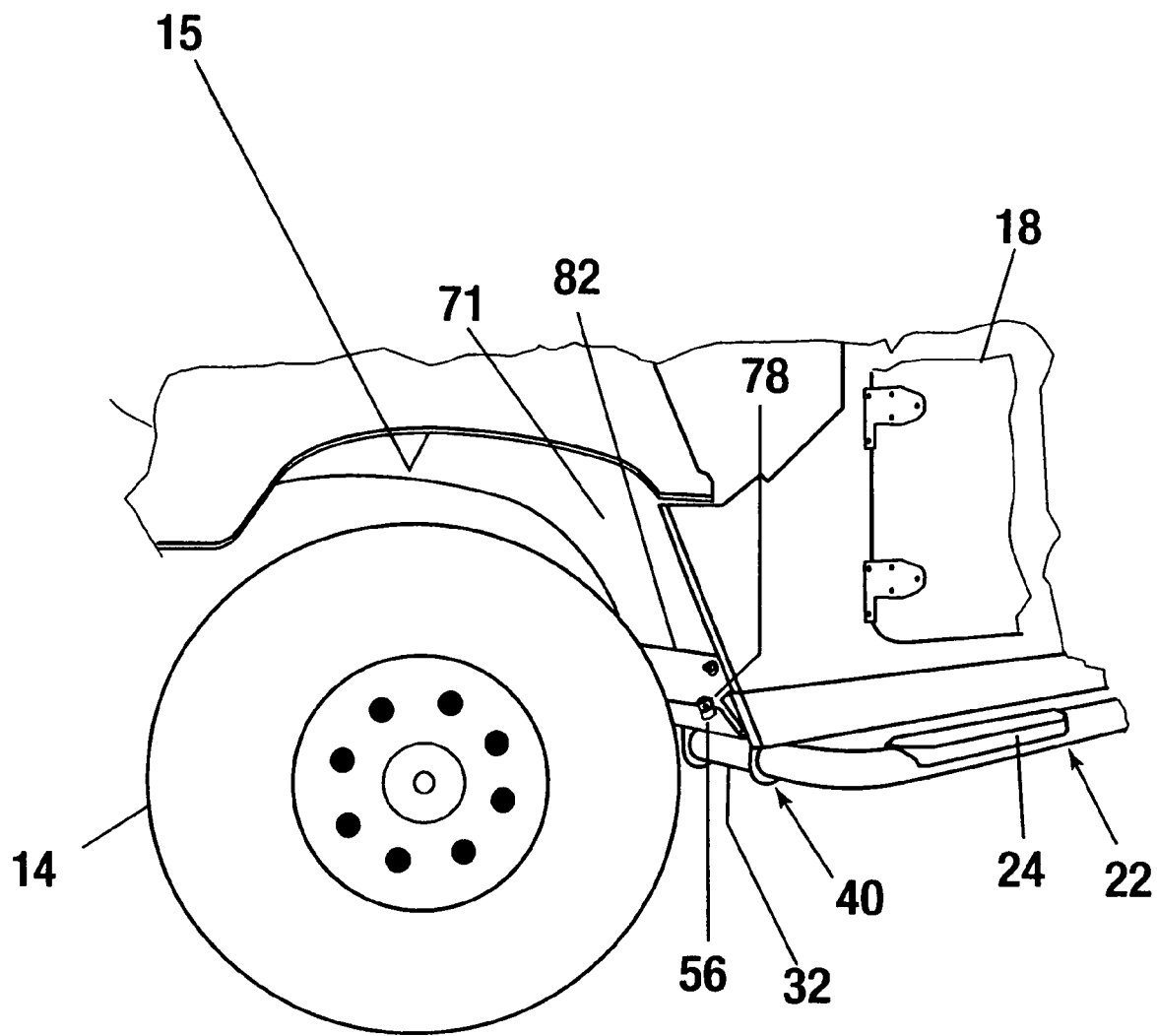
FIG. 2 is a fragmentary enlarged isometric view of a portion of the front wheel and front fender well of the vehicle shown in FIG. 1 with the removable side step attached.
Figure 3:
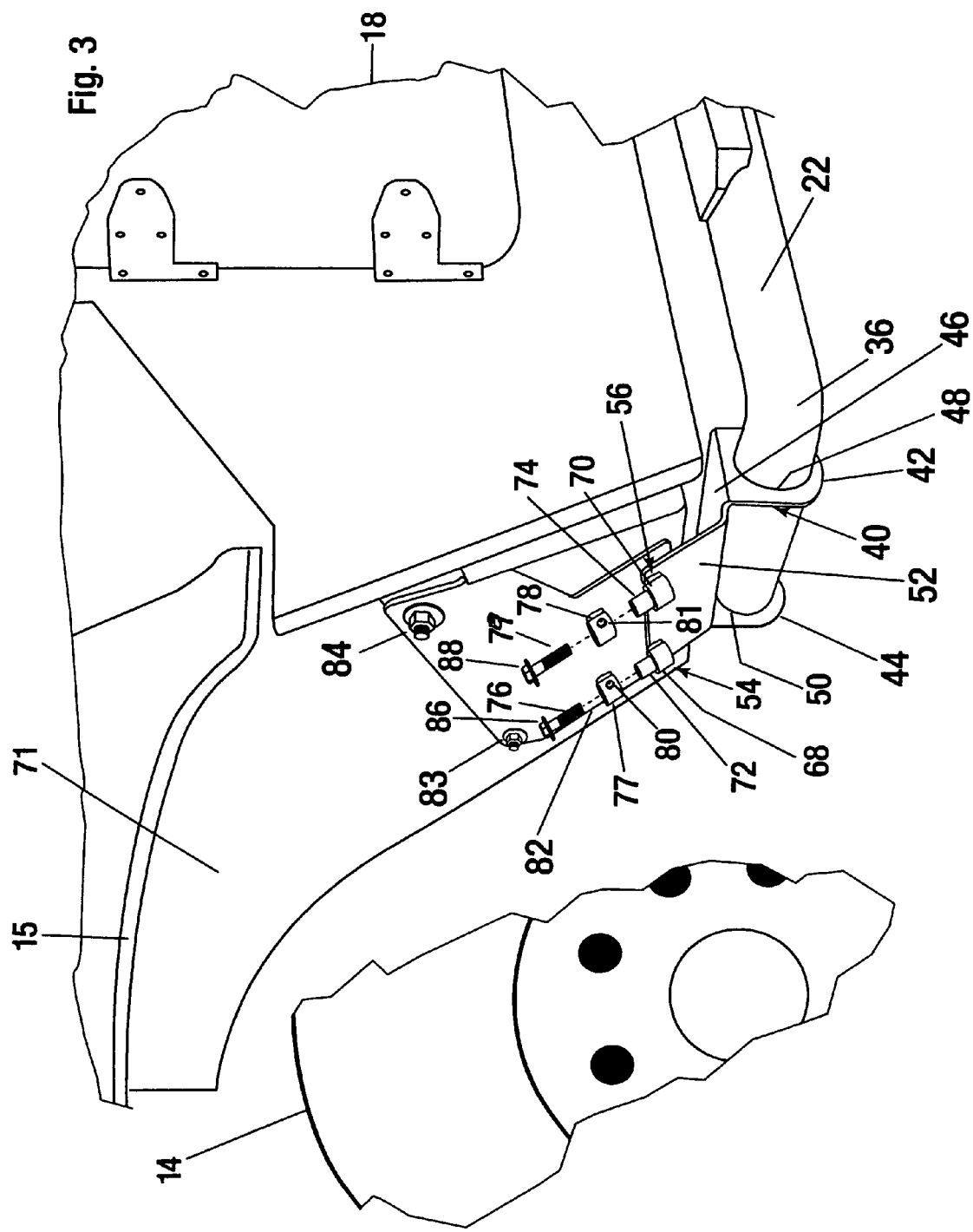
FIG. 3 is an exploded view of the parts shown in FIG. 2.

Referring to FIGS. 2 and 3, the first projection 32 includes a U-shaped first attachment member 40 having first and second flanges 42, 44 joined together by a center plate 46. The flanges 42, 44 have circular apertures 48, 50 therein into which the distal end of the first projection 32 is fitted and retained therein by weldings around the apertures 48, 50 and against the side wall of the cylindrical projection 32. The first attachment member 40 also has a generally upwardly extending attachment plate 52 extending from the center plate 46 and the attachment plate 52 has a pair of tubular connectors 54, 56 welded thereon. The connectors 54, 56 each include a generally cylindrical body portion 68, 70 respectively and extending from an end of the body portion 68, 70 and adjacent to the inner surface 71 of the fender well 15 is a tubular retaining element 72, 74 respectively. The tubular retaining elements 72, 74 each has an inner threading complementary to the threadings of a retaining bolt 76, 79 respectively for retaining the tubular connectors 54, 56 and thereby retaining the forward end of the side step 22 to the vehicle body 12.

The retaining elements 72, 74 are received in the complementary inner openings of a pair of quick release connectors 77, 78 mounted to the surface 71 of the front fender well 15. The quick release connectors 77, 78 are tubular with the inner openings thereof sized to slideably receive the tubular retaining elements 72, 74 of the connectors 54, 56. Each of the quick release connectors 54, 56 has a grease fitting 80, 81 thereon, respectively, to lubricate the connecting parts so that they may be more easily disassembled or assembled. In the preferred embodiment, the quick release connectors 77, 78 are welded onto a metal plate 82 that is retained against the inner surface 71 of fender well 15 by a pair of bolt and nut assemblies 83, 84 that connect to reinforced portions of the vehicle body 12. The parts are shaped and sized so that the retaining elements 72, 74 of the connectors 54, 56 will fit within the central openings of the tubular quick release connectors 77, 78 when the forward end of the side step 22 is properly positioned with respect to the doors 18, 20 of the vehicle 10. With the retaining element 72, 74 fitted within the quick release connectors 77, 78 the retaining bolts 76, 79, with lock washers 86, 88 thereon respectively, can be threaded into the threaded inner openings of the cylindrical retaining elements 72, 74 thereby retaining the forward end of the side step 22.

Figure 4:
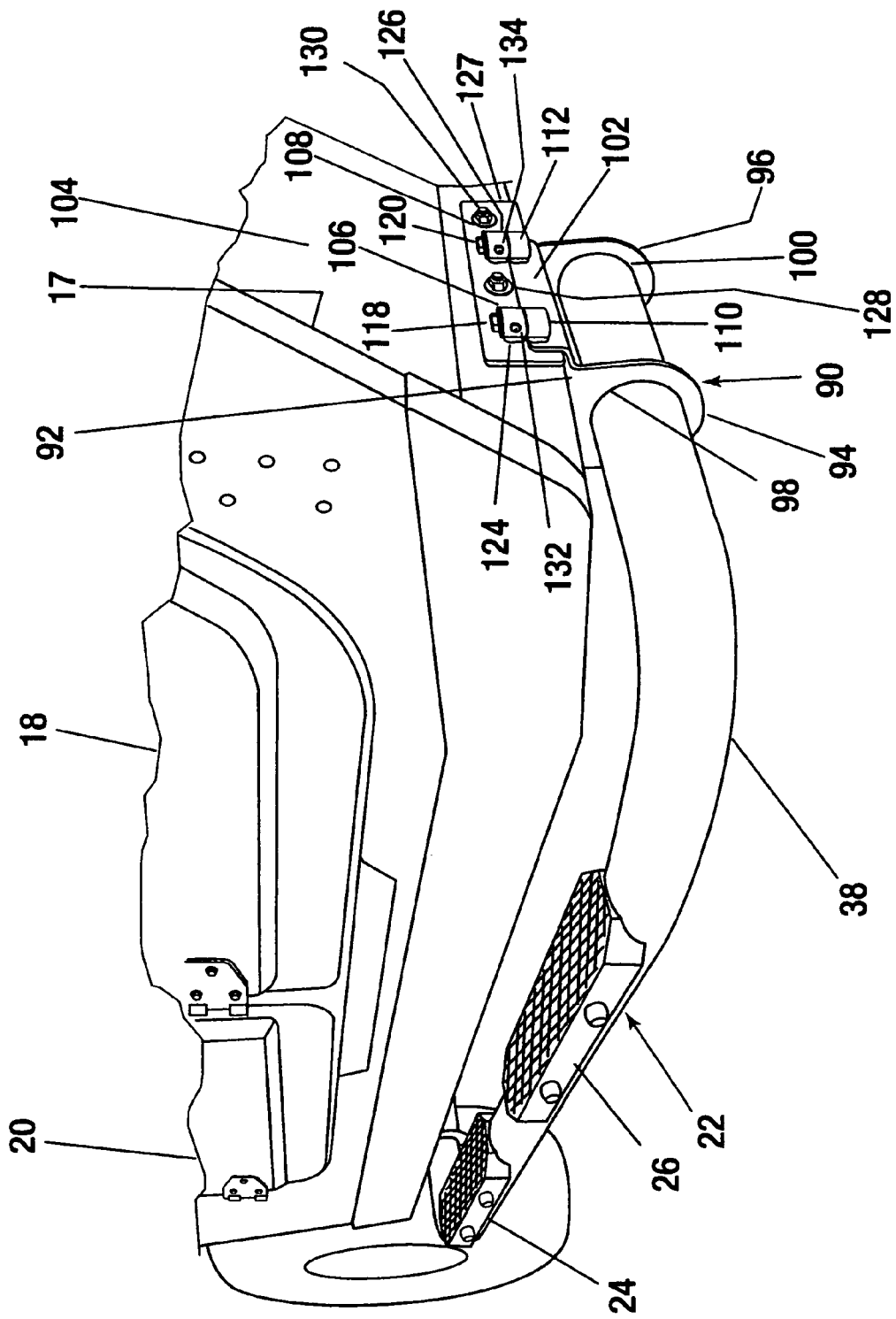
FIG. 4 is a fragmentary enlarged isometric view of a portion of the rear fender well of the vehicle shown in FIG. 1 showing the attachment thereto of the removable side step in accordance with the invention.

Referring to FIG. 4, the side step 22 has a second attachment member 90 on the rearward projection 34. The second attachment member 90 includes a central plate 92 at opposite ends of which are a pair of flanges 94, 96. Apertures 98, 100 in the flanges 94, 96 respectively are sized to receive the cylindrical inwardly directed second projection 34 and the parts are held together by a weld, not shown. Extending from the central plate 92 is a attachment plate 102 angled with respect to the central plate 92 so as to rest against an inner surface 104 of the rear fender well 17 for the rear wheel 16 of the vehicle 10.

At the upper end of the attachment plate 102 is a pair of tubular connectors 106, 108 similar to the connectors 54, 56 on the first attachment member 40. Like those on the first attachment member 40, the connectors 106, 108 include cylindrical bodies 110, 112 and extending in a upwardly direction along the inner fender surface 104 of the rear fender well 17 from each of the bodies 110, 112 is a tubular retaining element, not visible, the inner opening of which is threaded to threadedly receive retaining bolts 118, 120.

Positioned on the wall 104 of the rear fender well 17 are a pair of quick release connectors 124, 126. In the preferred embodiment, the quick release connectors 124, 126 are mounted on a plate 127 that is retained against the inner surface 104 of the rear fender well 17 by a pair of bolt and nut assemblies 128, 130. Each of the quick release connectors 124, 126 also has a grease fitting 132, 134 respectively for lubricating the connecting parts so that the connectors 106, 108 can be more easily connected to or released from the associated quick release connectors 124, 126.

The various parts are sized and shaped so that the tubular retaining elements 114, 116 will extend through the central opening in the quick release connectors 124, 126 when the rear end of the side step 22 is positioned under the doors 18, 20 with the tubular connectors 54, 56 of the first attachment members assembled to their associated quick release connectors 58, 60. With the parts so assembled, the retaining bolts 118, 120 with lock washers, not shown, thereon can be threaded into the threaded apertures of the retaining elements 114, 116 to retain the rear portion of the side step 22 in place.

It should be appreciated that with the forward end of the side step 22 attached to the body 12 of the vehicle 10 by quick release connectors 58, 60 positioned on the inner fender well 71 of the front wheel 14 it is protected against damage caused by striking hard objects such as stones and the like as the vehicle passes over rough terrain. In similar fashion, with the second end 34 of the side step 22 attached by quick release connectors 112, 114 mounted to the inner surface 104 of the rear fender well 17 it is also protected against damage from striking hard objects as the vehicle passes over rough terrain. Accordingly, the first attachment member 40 can be disconnected from the forward quick release connectors 58, 60 and the second attachment member 90 can be disconnected from the rearward quick release connectors 124, 126 when the side step 22 is to be removed and the vehicle driven off road. While being driven off road, the quick release connectors 58, 60, 112, 114 will remain undamaged such that the side step 22 can be reassembled when the vehicle 10 is to return to the hardened road.

While the present invention has been described with respect to a single embodiment, it will be appreciated that many modifications and variations may be made without departing from the true spirit and scope of the invention. It is therefore the intent of the following claims to cover all such variations and modifications that fall within the true spirit and scope of the invention.

What is claimed:

1. A removable side step for a vehicle wherein said vehicle has a body that includes a front fender well and a rear fender well, said removable side step comprising a side step member having a forward end, a rearward end, and a longitudinal axis, a forward cylindrical projection extending from said forward end and generally perpendicular to said longitudinal axis, a rearward cylindrical projection extending from said rearward end and generally perpendicular to said longitudinal axis, a bracket around said forward cylindrical projection, a mounting plate connected to said bracket, said mounting plate sized and shaped to extend along a surface of said front fender well, a first connector in said front fender well for removably receiving said first mounting plate, and
an attachment member on said rearward cylindrical projection,
a second connector in said rear fender well for removably receiving said attachment member,
wherein said side step can be removed from said vehicle by disconnecting said mounting plate and said attachment member from said first and second connectors.

2. The removable side step of claim 1 wherein said first connector is mounted on a plate and said plate is secured within said front fender well.

3. A removable side step for a vehicle wherein said vehicle has a body that includes a front fender well and a rear fender well, said removable side step comprising
   a side step member having a forward end, a rearward end, and a longitudinal axis,
   a forward cylindrical projection extending from said forward end and generally perpendicular to said longitudinal axis,
   a rearward cylindrical projection extending from said rearward end and generally perpendicular to said longitudinal axis,
   an attachment member on said forward projection,
   a first connector in said front fender well for removably receiving said first attachment member,
   a bracket around said forward cylindrical projection,
   a mounting plate connected to said bracket, and
   said mounting plate sized and shaped to extend along a surface of said front fender well,
   a second connector in said rear fender well for removably receiving said mounting plate,
   wherein said side step can be removed from said vehicle by disconnecting said attachment member and said mounting plate from said first and second connectors.

4. The removable side step of claim 3 wherein said second connector is mounted on a plate and said plate is secured within said rear fender well.

* * * * *